April 23, 1935. H. HUEBER 1,998,760
COMBINED WINDSHIELD AND CLEANER THEREFOR
Filed May 11, 1931

Inventor
Henry Hueber,
By Bean Brooks + Henry.
Attorneys

Patented Apr. 23, 1935

1,998,760

UNITED STATES PATENT OFFICE 1,998,760

COMBINED WINDSHIELD AND CLEANER THEREFOR

Henry Hueber, Buffalo, N. Y., assignor to Trico Products Corporation, Buffalo, N. Y.

Application May 11, 1931, Serial No. 536,621

7 Claims. (Cl. 15—255)

This invention relates to a windshield cleaner installation on motor vehicles.

Heretofore, the windshield cleaner has been mounted within the automobile, or at the rear side of the windshield, with its shaft protruding through the windshield frame and supporting the wiper at its outer end. With the development of the motor vehicle, visors were provided to overhang the forward side of the windshield, thereby affording a suitable space thereunderneath for housing exteriorly mounted windshield cleaners. This exterior mounting of the windshield cleaner motor permitted a neater interior finish for the automobile. More recently the visors have been eliminated from motor car equipment, and therefore the windshield cleaner mounted either exteriorly or interiorly would tend to detract from the appearance of the automobile, and further, would be exposed to the weather if disposed outside.

The present invention has for its object to more intimately associate and combine the windshield cleaner with the header bar or frame construction of the windshield as a unit and in a manner to house and protect the operative parts of the windshield cleaner assembly and conceal from view the same when parked, whereby the general appearance of the vehicle is greatly improved.

Figure 1:
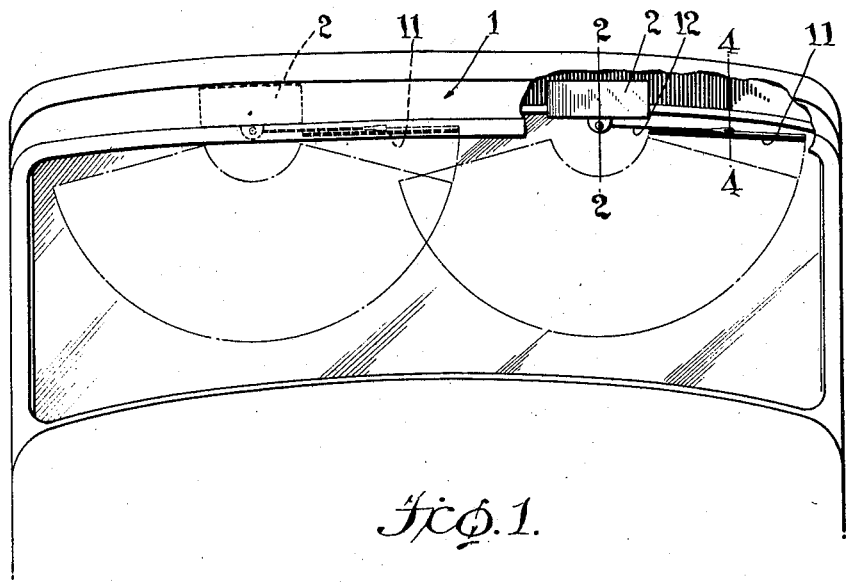
Fig. 1 is a front elevation of a windshield depicting one embodiment of the present invention with the operative parts of the windshield cleaner illustrated in dotted lines.
Figure 3:
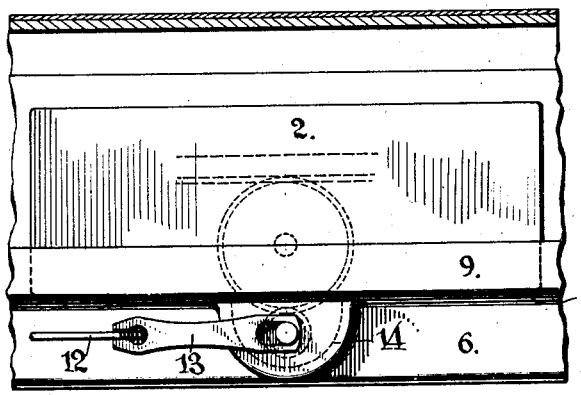
Fig. 3 is a fragmentary section showing the rear side of the windshield frame member in elevation and the windshield wiper in its parked position.
Figure 2:
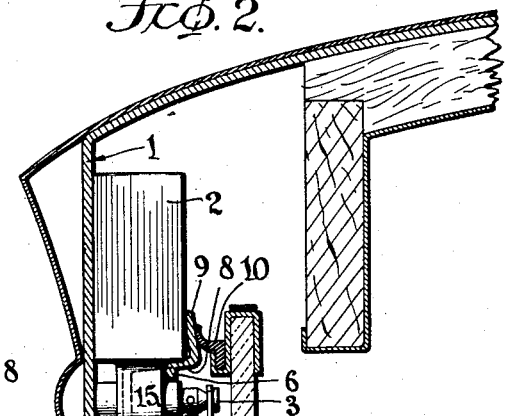
Fig. 2 is a transverse sectional view about on line 2—2 of Fig. 1 through the improved windshield and cleaner construction with the windshield cleaner being left in elevation and with the wiper in its intermediate wiping position.
Figure 4:
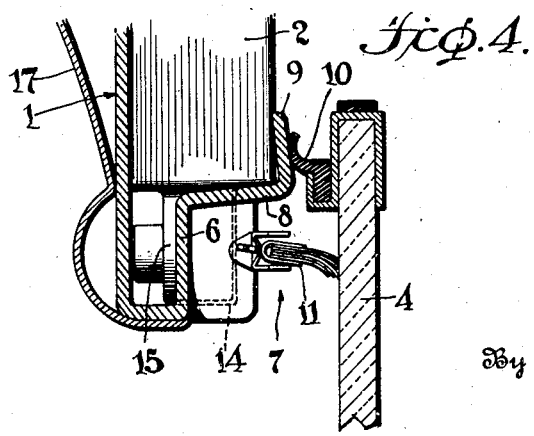
Fig. 4 is a detailed section about on line 4—4 of Fig. 1.

In proceeding in accordance with the present invention the numeral 1 designates a frame member of a windshield which, in the present showing, comprises the header bar. This header bar is chambered to enclose and serve as a housing for a windshield cleaner motor 2, the wiper operating shaft 3 of which is extended rearwardly toward the windshield glass 4 and terminates short thereof. The shaft 3 is disposed above the lower marginal portion 5 of the header bar 1 which portion constitutes a framing margin or portion, along the upper edge, for the transparent area of the windshield. Consequently the shaft is disposed outside of this transparent area and therefore concealed from view. The operating mechanism for the windshield cleaner may be of a preferred type although that herein depicted is of the fluid pressure or suction operated design in which a reciprocatory piston has its movement imparted to the wiper shaft through a rack and pinion transmission schematically shown in Fig. 3.

The framing portion 5 of the header bar 1 is preferably in the form of a rearwardly extending flange, which is then turned upwardly, as at 6, to define a pocket 7 between the wall 6 and the glass 4, the wall 6 being spaced forwardly from the glass 4 to define such pocket. The upper part of the wall 6 is extended horizontally toward the glass to form a ceiling 8 for the pocket, and the rear edge portion of the ceiling 8, adjacent the glass, is turned upwardly at a forward incline to constitute a stop 9 against which a packing strip 10, on the glass 4, engages to form a weather-tight joint.

A wiper, in the form of a blade 11, is carried by an arm the latter being connected to the shaft 3, within the pocket 7, by the spring device 13. The wiper 11 is capable of movement through an arc of approximately 180° for being parked to either side of the shaft in the pocket 7, but during its normal operation the wiper is preferably given an operative movement through an arc of a sufficiently less number of degrees to avoid normal operation into and out of the pocket and the packing of snow therein.

Windshield cleaners which permit of movement of the wiper blade beyond its normal operative path for the purposes of parking the wiper blade in an idle or rest position are well known in the art and examples thereof may be seen in the following Patents Nos. 1,738,311 granted to John R. Oishei and myself on December 3, 1929, and 1,693,665 granted to J. X. Phillips. Jr. on December 4, 1928.

The depth of the pocket, or that distance between the forward wall 6 and the rear wall 4 of the pocket, will be amply sufficient to accommodate and receive the blade 11 with its wiper carrying arm 12 so that all of the operative parts of the windshield cleaner will be rendered invisible when in its parked position and will not obstruct the field of vision of the driver. It further will eliminate any unsightliness of the blade and its arm which might tend to detract from the neat appearance of the automobile. The header bar will therefore constitute and serve as a housing not only for the motor but also the shaft 3, the arm 12 and the wiper 11 to protect them from exposure to the weather and the oxidizing influence which the sun might have on the rubber element of the wiper. When thus the windshield cleaner is parked no part of the same will be exposed to view either from the interior or the exterior of the car.

The wall 6 is provided with a depression 14 in which is received a depending shaft supporting portion 15 of the windshield cleaner motor, and the rear wall of such recess is provided with an opening 16 opposing the glass 4 and through which the shaft 3 protrudes into the correspondingly reduced depth of the adjacent pocket portion.

The windshield header bar may consist merely of a unitary body or it may be formed of sections for trim and ornate purposes, as indicated at 17. The resultant effect is that the windshield cleaner is given a protective housing in the form of, and which serves as, a header bar or framing section for the transparent area of the windshield. Such housing or header bar will serve as an effective means for protecting the blade and arm and afford a neat uninterrupted framing for the transparent area. The parking of the wiper up behind the framing portion 5 will hide the same from view so that if the wiper should wave or move, as it might under certain air pressure conditions, it will be in such position as to be unnoticed by the driver.

What is claimed is:

1. A windshield frame member having a framing marginal portion, a windshield carried in the frame member and spaced rearwardly from a portion of the framing marginal portion to form a pocket for receiving a windshield wiper, a windshield cleaner concealed by the frame member and having a wiper operating shaft extending away from the framing portion toward the glass, said shaft terminating in the pocket and being concealed by said framing portion, a wiper carrying arm connected to the shaft for being oscillated thereby, and a wiper carried by the arm, said pocket being of a size to permit movement of the wiper by the shaft into the pocket aforesaid to be housed therein when parked.

2. A windshield and cleaner supporting construction, comprising a chambered windshield frame member, cleaner operating mechanism arranged within the chamber of the frame member, a portion of said frame member being spaced forwardly from the windshield for defining with the windshield glass a pocket for receiving a wiper blade, said mechanism including a shaft extending into the pocket, and a wiper blade connected to the shaft, said pocket being of a size to permit movement of the wiper by the shaft into the pocket for parking purposes, said wiper having a normal operative path of movement short of the pocket.

3. A windshield and cleaner supporting construction comprising a header bar having a framing portion spaced forwardly from the windshield glass to provide a pocket between the glass and framing portion for receiving a wiper blade, a cleaner mechanism having a shaft projecting from above the lower edge of the framing portion into the pocket short of the glass, a wiper blade movable into the pocket for parking purposes, and means connecting the wiper blade to the shaft, said pocket being of a size to permit movement of said wiper blade and said means into the pocket.

4. In a windshield framing and supporting structure, a windshield framed and supported in said structure, said structure having a flange spaced from the windshield glass and a marginal portion on said flange extending rearwardly toward the windshield glass and thence upwardly to define a chamber, a windshield cleaner motor contained within the chamber and having an actuating shaft projecting through the upwardly extending border of said marginal portion, said marginal portions being spaced from adjacent portions of the frame structure lying rearwardly of said marginal portion and forming therewith a pocket opening toward the transparent area of the windshield for receiving a windshield wiper and arm structure, and a wiper and arm structure connected to the shaft and movable thereby into the pocket to a shielded position.

5. In a windshield framing and supporting structure formed to provide a housing, a wiper operating mechanism arranged within the housing and having an actuating shaft projecting through a wall of the housing toward the windshield glass, said mechanism including a wiper and arm structure connected to the shaft for oscillatory movement thereby, said housing extending along a portion of the windshield in spaced relation thereto, portions of the framing and supporting structure including the housing forming with the windshield a pocket opening toward the transparent area of the windshield of a size for receiving the wiper and arm structure, said wiper and arm structure being movable into said pocket to a concealed position for parking purposes.

6. A windshield framing and supporting structure having a channel formed therein, a windshield spaced rearwardly from the channel, a cleaner motor mounted in the channel, one wall of the channel and the adjacent frame structure portions forming with the windshield a pocket opening toward the transparent area of the windshield of a size for receiving a wiper, and a wiper extending from the cleaner and movable across a portion of the windshield, said wiper being movable into said pocket and the entire cleaner and wiper structure being shielded in the pocket in its inoperative position.

7. In combination, a windshield having a chambered header bar, the header bar having a framing portion spaced from the windshield to form with the windshield a pocket of a size sufficient to receive a wiper and opening toward the transparent area of the windshield, a windshield cleaner operating mechanism arranged within the chambered portion of the header bar and having a shaft extending into the pocket, and a wiper operable by the shaft and movable to a parked position within the pocket to be housed therein.

HENRY HUEBER.